United States Patent [19]

Spengler

[11] Patent Number: 4,634,483
[45] Date of Patent: Jan. 6, 1987

[54] APPARATUS FOR PERFORMING SEVERAL DIFFERENT OPERATIONS ON AN INITIALLY FLAT WORK PIECE

[75] Inventor: Ernst M. Spengler, Heusenstamm, Fed. Rep. of Germany

[73] Assignee: Stanztechnik GmbH R & S, Frankfurt, Fed. Rep. of Germany

[21] Appl. No.: 712,708

[22] Filed: Mar. 15, 1985

[51] Int. Cl.$^4$ .............................................. B29C 17/04
[52] U.S. Cl. ..................................... 156/216; 156/267; 156/486; 156/492; 264/45.4; 425/302.1; 425/305.1; 425/317
[58] Field of Search ............... 156/216, 212, 213, 267, 156/486, 492; 425/289, 302.1, 305.1, 317, 394, 397, 398, 399, 400, 510, 514, 520, 521, DIG. 48, 407; 264/154, 45.4

[56] References Cited

U.S. PATENT DOCUMENTS

| | | | |
|---|---|---|---|
| 2,500,895 | 3/1950 | Davies | 156/216 X |
| 3,075,862 | 1/1963 | Hoyer | 156/216 X |
| 3,192,800 | 7/1965 | Kostur | 425/394 X |
| 3,340,574 | 9/1967 | O'Brien et al. | 425/407 |
| 3,668,033 | 6/1972 | Evans | 156/216 X |
| 3,807,920 | 4/1974 | Aoki | 425/130 X |
| 3,914,103 | 10/1975 | Dean et al. | 425/397 |
| 4,127,378 | 11/1978 | Meadors | 425/394 X |
| 4,273,738 | 6/1981 | Spengler | 264/154 |
| 4,328,067 | 5/1982 | Csano | 156/267 X |
| 4,405,537 | 9/1983 | Spengler | 264/45.4 |
| 4,478,664 | 10/1984 | Elias | 156/216 |
| 4,508,499 | 4/1985 | Spengler | 425/302.1 X |
| 4,519,766 | 5/1985 | Spengler | 425/302.1 |

Primary Examiner—Charles Hart
Attorney, Agent, or Firm—W. G. Fasse; D. H. Kane, Jr.

[57] ABSTRACT

Sheet material to be laminated to a substructure is presented in a stretched out condition for enclosing between upper and lower laminating tools. For this purpose a sheet material transport mechanism such as a tentering frame is movable back and forth between the laminating station and a sheet receiving position. The sheet margins around outer and inner edges of the laminated work piece are then trimmed and bent over inwardly. These operations are performed while keeping the work piece on the same lower tool or mold during all operations. The lower tools are moved from laminating to trimming and vice versa on a turntable.

12 Claims, 3 Drawing Figures

APPARATUS FOR PERFORMING SEVERAL DIFFERENT OPERATIONS ON AN INITIALLY FLAT WORK PIECE

CROSS-REFERENCE TO RELATED APPLICATIONS

My copending applications U.S. Ser. No. 12,709, filed on Mar. 15, 1985, U.S. Ser. No. 712,395, filed on Mar. 15, 1985, U.S. Ser. No. 712,567, filed on Mar. 15, 1985 and U.S. Ser. No. 719,497, filed on Apr. 4, 1985 are related to the present disclosure.

FIELD OF THE INVENTION

The invention relates to an apparatus for performing several different operations on an initially flat work piece. Such flat work pieces as cloth, or fabric, or synthetic material films or sheets are laminated to the surface of substructures such as inner car door frames or dashboards or the like.

DESCRIPTION OF THE PRIOR ART

U.S. Pat. No. 4,405,537 (Spengler) and U.S. Pat. No. 4,273,738 (Spengler) relate to machines for forming and trimming three-dimensional work pieces. These machines work fine in most instances, especially where the presentation of the sheet material in a stretched out condition is not a problem. However, where limp sheet material must be laminated onto a substructure it is desirable to present the sheet material to the molding tools so that creases and folds are avoided because the sheet material is usually laminated for decorative and finishing purposes to the substructure and such folds or creases normally result in rejects.

OBJECTS OF THE INVENTION

In view of the above it is the aim of the invention to achieve the following objects singly or in combination:

to construct a laminating apparatus in such a way that it can cooperate with a transport mechanism which presents the sheet material to the laminating tools in a stretched out or smooth surface condition;

to construct such an apparatus so that a lower platform carrying two identical lower tools can rotate these lower tools into cooperation with upper laminating tools or with upper trimming tools;

to transfer a piece of flat material from a transport mechanism such as a tentering frame or tentering chain conveyor on which the sheet material is held in a stretched out condition, to laminating tools while assuring that the transferring does not change the stretched out state of the sheet material; and to provide tools for folding over a trimmed sheet material margin around an edge of a substructure.

SUMMARY OF THE INVENTION

The above objects have been achieved by an apparatus in which a turntable rotatably supported by bearings in a machine base is rotatable from a first work station into a second work station and vice versa. Each work station has an upper section operatively supported by the machine frame and a lower section rotatably supported by the turntable. The turntable is driven for rotation into cooperation with one or the other of the upper work sections which are lockable in the machine frame, and which carry tools movable for the particular purpose.

The more important advantages of the invention are seen in that initially rather limp sheet material will now be presented to the laminating tools in such a way that creases and hence rejects are avoided. Further, by keeping the work piece on the same lower tool in all operations, the dimensional stability of the finished product is assured. A substantial number of hours of manual labor is saved because the trimmed edges are folded over the edges of the substructure to which the sheet material is laminated and simultaneously secured to the back surface of the substructure such as an inner car door frame or the like.

BRIEF DESCRIPTION OF THE DRAWINGS

In order that the invention may be clearly understood, it will now be described, by way of example, with reference to the accompanying drawings, wherein.

DETAILED DESCRIPTION OF PREFERRED EXAMPLE EMBODIMENTS AND OF THE BEST MODE OF THE INVENTION

Figure 1:
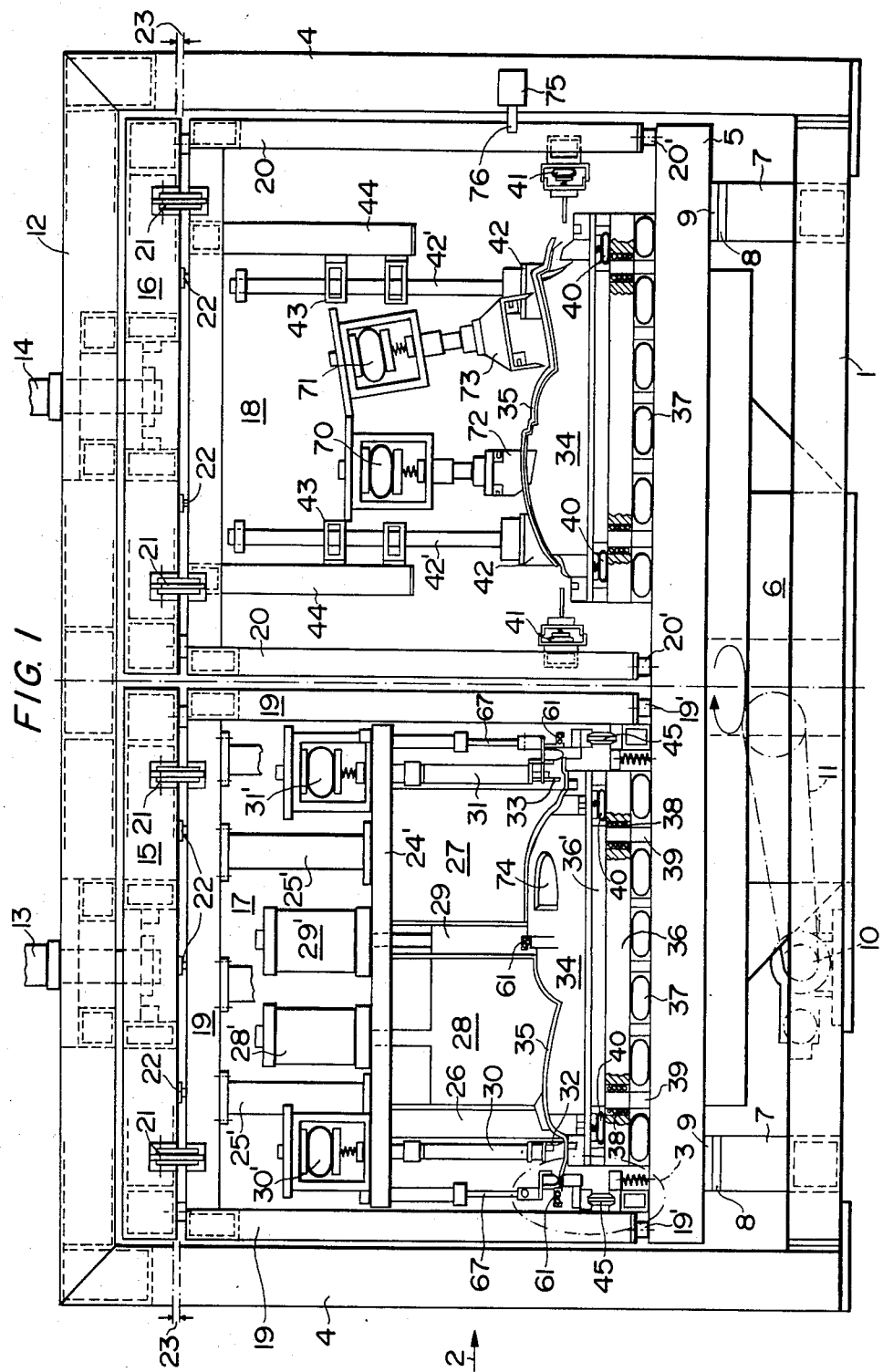
FIG. 1 is an elevational side view of an apparatus for performing several different operations on an initially flat work piece, whereby the left-hand portion shows a laminating station and the right-hand portion shows a trimming station.

FIG. 1 shows a laminating and trimming apparatus which has a common machine base 1 supporting a machine frame 4 and a turntable 5 rotatably held in a bearing socket 6 of conventional construction. Additionally, the turntable 5 rests with its outer ends on stationary pedestals 7 having an upper anti-friction surface 8 cooperating with an anti-friction surface 9 of the turntable 5. A motor and gear drive 10 drives the turntable 5, for example, through a pulley or chain drive 11 of conventional construction.

The frame 4 has a top support structure 12 which carries through piston cylinder devices 13 and 14 an intermediate carrier beam frame 15 and 16 respectively. The beam frame 15 is rotatable relative to the piston cylinder device 13. The beam frame 16 is rotatable relative to the piston cylinder device 14. Both beam frames, however, are rigidly held in the machine frame, except for the mentioned rotation and for a vertical movement driven by the respective piston cylinder devices 13, 14. The beam frame 15 carries a first work station 17 and the carrier beam 16 carries a second work station 18. Each work station has an upper section rigidly and precisely secured to its respective beam frame and a lower section rotatably supported by the turntable 5.

The upper section of the first work station comprises upper tools supported by a secondary frame 19. The second work station also comprises a secondary frame 20 for its upper tools. The secondary frame 19 is secured to the beam frame 15 by clamping members 21 known as "Destaco" clamps for an easy release of the secondary frame 19 from the beam frame 15. Additionally, adjustment screws and nuts 22 are arranged between the beam frame 15 and the top portion of the secondary frame 19 for precisely and rigidly spacing the secondary frame 19 from the beam frame 15. The secondary frame 20 is secured to the beam frame 16 in the same manner for a precise positioning, yet an easy removal and/or exchange, e.g., for retooling.

Incidentally, the interruption shown at 23 between the upper top support structure 12 of the machine frame 4 must be sufficient for moving the beam frames 15 and 16 with the secondary frames 19 and 20 attached thereto vertically up and down for opening and closing the respective tool sections. Thus, the columns of the secondary frames 19 and 20 can be lifted off their guide studs 19' and 20' rigidly secured to the top surface of the turntable 5. When the secondary frames 19 and 20 are engaged with the respective guide studs 19' and 20', the turntable 5 is stationary. For rotation of the turntable 5 the upper secondary frames 19 and 20 are lifted out of the guide studs 19' and 20'.

The secondary frame 19 carries a tool plate 24' rigidly spaced from the frame 19 by spacer members 25'. The plate 24' carries fixed upper mold components 26 and 27 which are movable up and down only together with the entire upper section of the first work station. The tool plate 24' further carries movable upper mold sections 28 and 29 movable by respective piston cylinder drive means 28' and 29'. Additionally, the plate 24' carries trimming tools 30 and 31 operated by respective expansion hose drive members 30' and 31'. Each trimming tool 30 and 31 is provided with a strip steel trimming knife 32 and 33 respectively. These trimming knives extend all around the lower mold member 34 forming the lower tool means of the lower section of the first work station. The plate 24' further carries hold down piston cylinders 67 which will be described in more detail below with reference to FIG. 3. This applies also to guide rollers 45 which carry a tentering frame 24 for presenting a piece of sheet material 35 into the space between the upper mold components 26 to 29 and the lower mold component 34 in an initially stretched out smooth surface condition. Component 34 may be the substructure.

The lower tool or mold 34 rests on a platform 36 which can be raised and lowered by expansion hose drives 37 guided in ball boxes 38. Reset springs not shown return the platform 36 into the mold open condition. FIG. 1 shows the mold closed condition in conformity with FIG. 3. Guide posts 39 rigidly secured to the turntable 5 reach slidingly into the ball boxes 38.

Expansion hose drive members 40 are provided for the margin folding tools 41 which are described in my copending application Ser. No. 712,709, filed Mar. 15, 1985 for: "METHOD AND APPARATUS FOR FOLDING FLEXIBLE MATERIAL MARGINS AROUND AN EDGE". The disclosure of Ser. No. 712,709 is incorporated herein by reference. These margin folding tools 41 are also shown schematically in the second work station shown in the right-hand part of FIG. 1.

Referring further to FIG. 1, the second work station comprises the above mentioned upper section with downholders 42 carried by guide rods 42' supported in mounting brackets 43 secured to mounting frame members 44. The position of these hold down members 42 is adjustable in the brackets 43 vertically up and down by conventional means. However, in operation these mounting brackets 43 mount the hold down members 42 in a rigid manner so that a vertical up and down movement of the secondary frame 20 brings the hold down members 42 to bear against the sheet material or work piece 35 on the lower mold 34 or removes the hold down members 42 from the work piece respectively.

The secondary frame 20 also carries expansion hose drives 70 and 71 for driving trimming tools 72 and 73 respectively. These trimming tools are primarily intended for cutting internal edges, for example around holes 74 shown in the left-hand part of FIG. 1. A piston cylinder locking device 75 is preferably provided for locking the rotatable apparatus components relative to the machine frame 4. A piston rod 76 may engage any one of the secondary frame elements or even the turntable 5.

Figure 2:
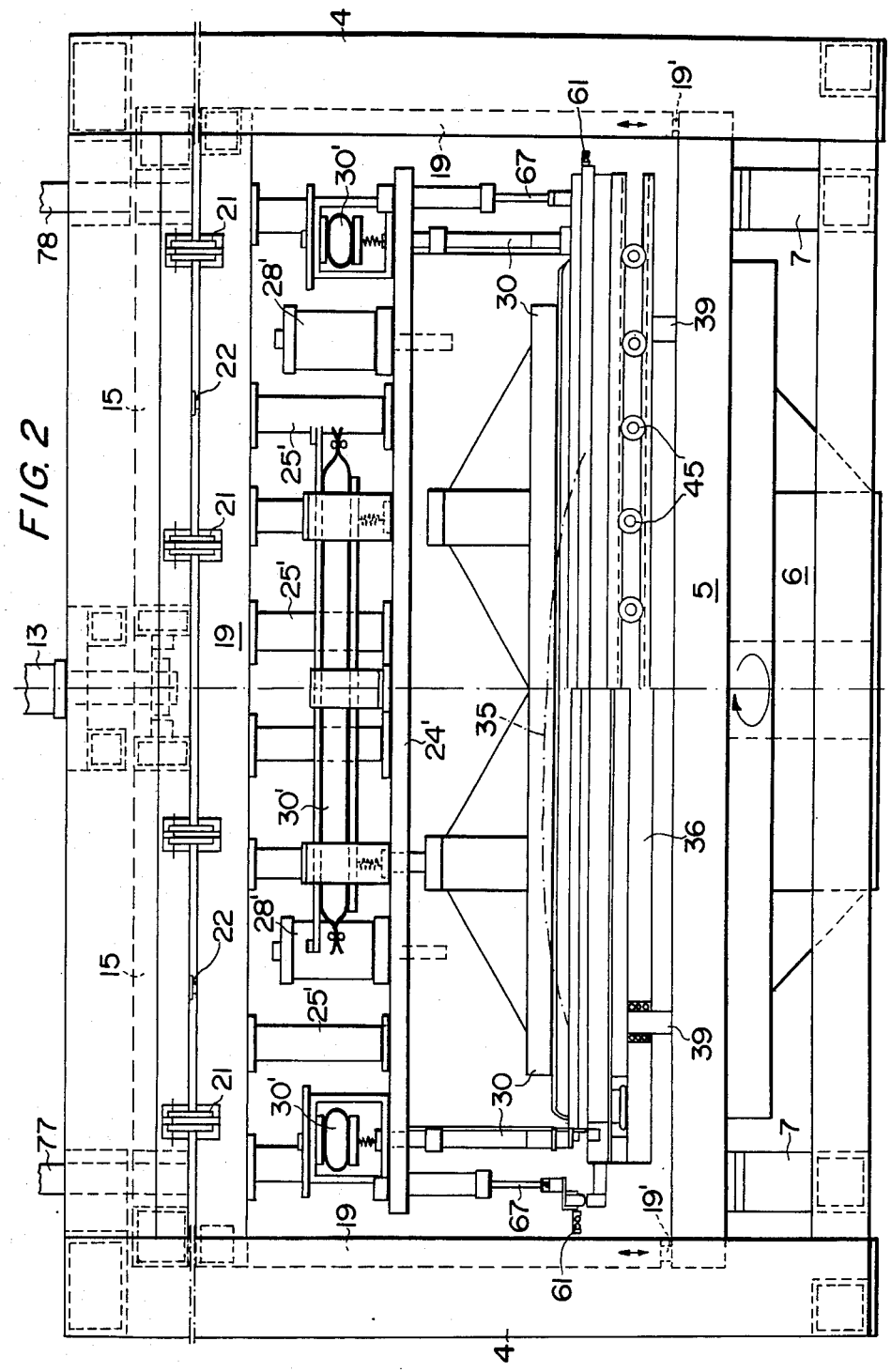
FIG. 2 is an elevational view in the direction of the arrow 2 in FIG. 1.

A further description of FIG. 2 is not necessary. However, the same reference numbers which have been used in FIG. 1 are also inserted in FIG. 2 and hence the FIG. 2 is self-explanatory. However, it should be mentioned that guide columns 77 and 78 not shown in FIG. 1 make sure that the beam frames 15 and 16 are properly guided vertically up and down.

Figure 3:
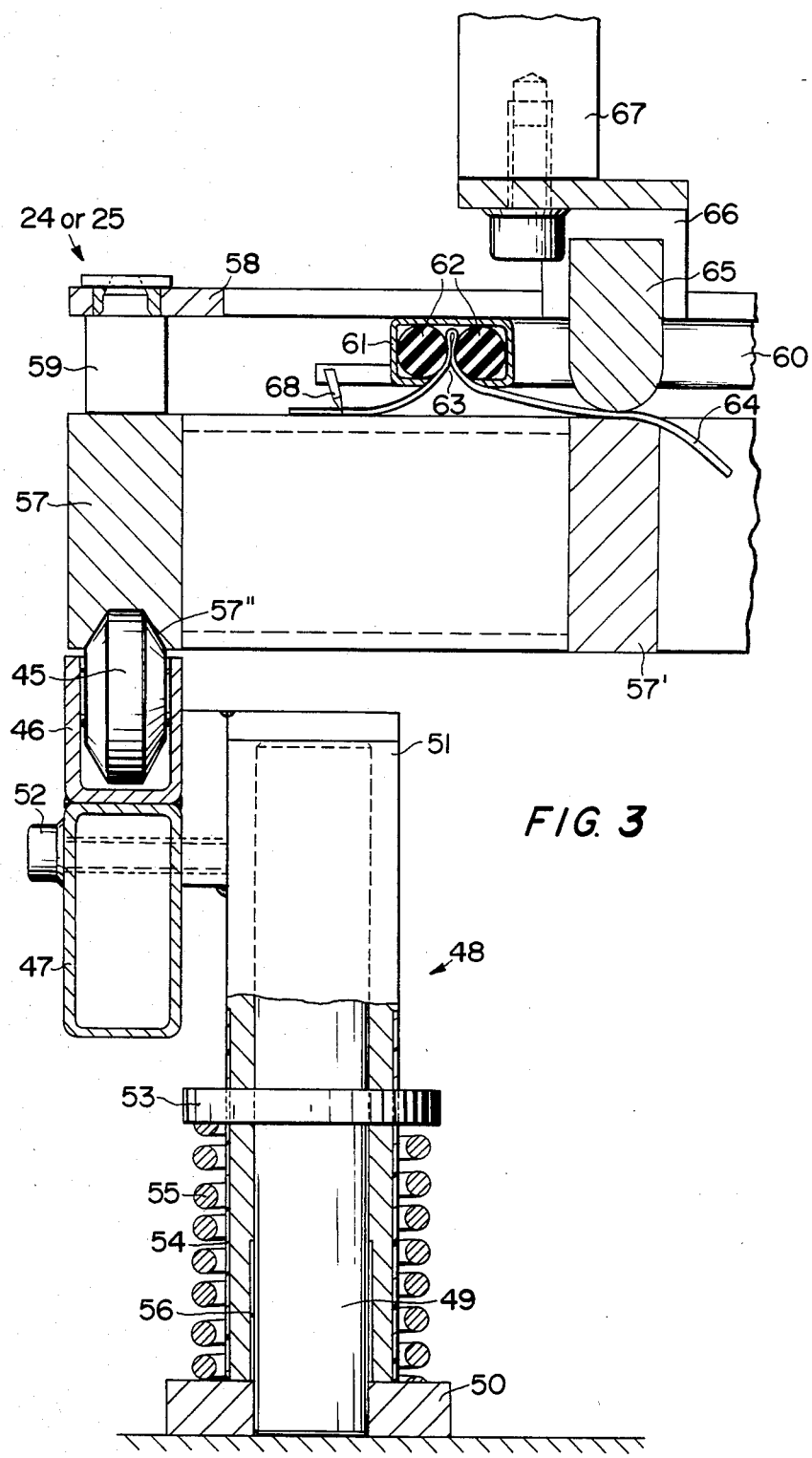
FIG. 3 is an enlarged illustration of the portion enclosed by a dashed line 3 in FIG. 1.

FIG. 3 shows further details of a tentering frame 24 or 25, whereby the view shown in FIG. 3 on an enlarged scale is approximately the portion enclosed by a dashed line 3 in FIG. 1. The tentering frame 24 or 25 is supported in the laminating station by rollers 45 rotatably mounted in brackets 46 secured to rails 47. The rails 47 in turn are secured to a support structure 48 forming part of the laminating station. The support structure comprises an upright post 49 rigidly secured to a base 50, which may be the turntable 5 itself, and a telescoping tubular member 51 to which the rails 47 are secured by bolts 52. The tubular member 51 can telescope vertically up and down guided by the post 49 to permit the closing of the mold 34 in the laminating station, as will be described in more detail below. As shown in FIG. 3 the tubular member 51 is in its lowermost position which means, that the mold is closed. Additionally, the normal position of the tubular member 51 relative to the post 49, when the mold is open, can be adjusted by a nut 53 rotatable on a threading 54 on the outside of the member 51. A compression spring 55 is located between the base 50 and the adjustment nut 53 and surrounds the tubular member 51. When the mold is open in the laminating station, the spring 55 will push the rails 47 and thus the rollers 45 upwardly to a level, in which the rollers 45 are at the same level as a level at which a tentering frame 24, 25 is pushed into the laminating station. Thus, a tentering frame can easily ride onto the rollers 45 and back again.

A lubricant or friction reducing coating 56 may be provided between the inner surface of the tubular member 51 and the outer surface of the post 49, whereby the up and down movement is facilitated and a proper guiding is assured.

Each tentering frame 24, 25 comprises a main frame 57 for structural rigidity and a sheet material carrier frame 58. The carrier frame 58 is releasably secured to the main frame 57 by conventional spacer members 59. The carrier frame 58 carries a clamping device 60 having a tubular stock housing 61 with two rubber cords 62 relatively tightly held in the housing 61 to form a clamping gap 63 in which the margin of a piece of sheet material 64 is held in place. The clamping device 60 is described in more detail in my copending application U.S. Ser. No. 712,567, filed Mar. 15, 1985, for "ELONGATED CLAMPING DEVICE, ESPECIALLY FOR FLAT MATERIAL".

The main frame 57 of the tentering frames includes a rail member 57' which cooperates with a counter holder rail 65 secured to a bracket 66 which in turn is attached to a piston rod 67 of a piston cylinder device forming part of the laminating station. The piston rods 67 with the rails 65 perform two functions, they temporarily hold down the tentering frame 57 and they clamp the sheet material 64 in place. Pin-type members 68 may be secured to the housing 61 for initially holding a margin of a piece of sheet material 64 in place prior to squeezing the margin into the clamping gap 63. Further, the main frame 57 of each tentering frame is preferably provided with a guide groove 57" for riding on the rollers 26, 27 and 45.

It will be noted that the lower tool means such as the lower mold 34 is identical in both stations so that the lower mold 34 can cooperate with both upper tool sections in the laminating station and in the trimming station.

The present apparatus operates substantially as follows. The lower mold 34, which itself may form part of a door frame, has been placed on the platform 36 or rather, on an intermediate plate 36'.

All the tools of the upper section of the laminating station are in the up position. Now the tentering frame may be moved into the laminating station on the rollers 45. Thus, the sheet 35 is uniformly stretched out just above the lower mold or substructure 34 to which the sheet is to be laminated. Now the piston rods 67 are moved down to additionally clamp the sheet material in the laminating station. Then the upper mold components 26 and 27 are also brought into contact with the sheet 35 and the mold is thereby closed, whereby the tentering frame is pressed down against the force of the spring 55 shown in FIG. 3. This mold closing operation substantially withdraws the sheet 35 from the clamping gap 63. Now the hose members 37 are inflated and the closed mold is pressurized sufficiently for the laminating of the sheet 35 onto the substructure 34. After a certain length of time which may be adjustable, the trimming tools 30 and 31 are operated so sever the margin of the sheet all around the closed mold while the laminating is still in progress. The trimming knives 32 and 33 complete the trimming operation. When the laminating and trimming is completed, the hoses 37 are deflated and the plate 36 is returned into its normal position downwardly. The locking piston cylinder 75, 76 is unlocked and the turntable 5 rotates the lower tool into the second work station for the further trimming operations as mentioned above, for example, around the hole 74 by the trimming tools 72, 73. During this operation the work piece is properly held in place by the hold down members 42. Simultaneously, the folding over units 41 are brought into the proper position and operated as described in more detail in my above mentioned copending application U.S. Ser. No. 712,709.

The operation of the trimming knives and of the hold down tools may be controlled by a program sequence not part of the invention. During this operation in the second work station, the second work station is also locked against the frame by the piston cylinder 75, 76 which is unlocked again when the work sequence in the second station is completed, whereupon the platform may be rotated back into the original position.

Although the invention has been described with reference to specific example embodiments, it will be appreciated, that it is intended, to cover all modifications and equivalents within the scope of the appended claims.

What I claim is:

1. An apparatus for performing several different operations on an initially flat work piece, comprising a machine base, machine frame means supported by said machine base, turntable means, bearing means rotatably supporting said turntable means on said machine base inside said machine frame means, a first work station and a second work station inside said machine frame means, each work station having an upper section operatively supported by said machine frame means for up and down movement, each work station also having a lower section rigidly supported by said turntable means for rotation with said turntable and for cooperation with one or the other upper work station section depending on the respective position of said turntable means, said upper and lower section of said first work station providing access therebetween for automatically feeding flat, limp sheet material into the first work station with the aid of tentering means, rotation drive means operatively connected to said turntable means for rotating said lower work station sections into cooperation with one or the other of said upper work station sections, wherein said upper section of said first work station comprises first upper laminating tool means, wherein said lower section of said first work station comprises first lower tool means carried by said turntable means and constructed for cooperation with said first upper laminating tool means, first reciprocating drive means for moving said first upper and lower tool means into cooperation with each other for laminating sheet material to a substructure, wherein said upper section of said second work station comprises second upper trimming tool means, wherein said lower section of said second work station comprises second lower tool means also carried by said turntable means and constructed for cooperation with said second upper trimming tool means, second reciprocating drive means for moving said second upper and lower tool means into cooperation with each other for trimming said sheet material along edges of said substructure, and wherein said first lower tool means and said second lower tool means each comprise identical lower mold means constructed for cooperation with said first and second upper tool means and vice versa in accordance with the respective turntable position.

2. The apparatus of claim 1, wherein said first and second drive reciprocating means comprise expansion hose operated compression means.

3. The apparatus of claim 1, wherein said first lower tool means comprise tenter frame support means including rollers (45) for supporting a tenter frame carrying sheet material in a stretched out condition into said apparatus for said laminating, and tenter frame hold down means (65, 66, 67) arranged for clamping a piece of sheet material when it is about to be enclosed between said upper and lower tool means.

4. The apparatus of claim 1, further comprising support means operatively arranged between said machine base and said turntable means at the radially outer ends of said turntable means for rigidly supporting said turntable means in the working position and for permitting a relative movement between said turntable means and said support means when said turntable means rotate.

5. The apparatus of claim 1, further comprising means for transporting a piece of sheet material into the apparatus for enclosing the piece of sheet material between said upper and lower tool means.

6. The apparatus of claim 5, wherein said transport means comprise a tentering frame with clamping means facing with a clamping gap substantially perpendicularly to a plane defined by said sheet material for presenting said sheet material in a stretched out, smooth condition to said upper and lower tool means.

7. The apparatus of claim 1, wherein said first work station comprises upper and lower laminating tool means, and means for driving or positioning said upper and lower tool means, and wherein said second work station comprises upper and lower trimming tool means and means for driving or positioning said trimming tool means for trimming margins off said sheet material after said laminating is completed.

8. The apparatus of claim 7, wherein said lower laminating tool means and said lower trimming tool means are identical to each other so that a work piece remains on the same lower tool means during the laminating and during the trimming for an improved dimensional stability and accuracy of the finished work piece and without the need for moving a work piece from one tool into another tool.

9. The apparatus of claim 1, wherein said first and second work stations comprise removable tool carrier subframes and means for locking said tool carrier subframes to said machine frame.

10. The apparatus of claim 1, further comprising means for folding a margin of a piece of sheet material around an edge of a substructure and for securing the folded margin to a back surface of said substructure.

11. An apparatus for performing several different operations on an initially flat work piece, comprising a machine base, machine frame means supported by said machine base, turntable means, bearing means rotatably supporting said turntable means on said machine base inside said machine frame means, a first work station and a second work station inside said machine frame means, each work station having an upper section operatively supported by said machine frame means for up and down movement, each work station also having a lower section rigidly supported by said turntable means for rotation with said turntable and for cooperation with one or the other upper work station section depending on the respective position of said turntable means, rotation drive means operatively connected to said turntable means for rotating said lower work station sections into cooperation with one or the other of said upper work station sections, said apparatus further comprising means for transporting a piece of sheet material into said first work station for enclosing the piece of sheet material between said upper and lower sections of said first work station, said means for transporting comprising a tentering frame including clamping means for gripping said sheet material along its edges for presenting said sheet material in a stretched out, smooth condition to said upper and lower sections of said first work station.

12. The apparatus of claim 11, wherein said lower sections of said first work station comprises tenter frame support means including rollers (45) for supporting said tenter frame carrying sheet material in a stretched out condition into said first work station of said apparatus, and wherein said upper section of said first work station comprises tenter frame hold down means (65, 66, 67) arranged for temporarily holding down said tentering frame in said first work station and for clamping a piece of sheet material when it is about to be enclosed between said upper and lower tool means to maintain said stretched out, smooth condition of said sheet material when said sheet material is transferred from said tentering frame into said first work station.

* * * * *